US009607571B2

(12) United States Patent
Sun et al.

(10) Patent No.: US 9,607,571 B2
(45) Date of Patent: Mar. 28, 2017

(54) INFORMATION PROCESSING METHOD AND ELECTRONIC DEVICE

(71) Applicants: BEIJING LENOVO SOFTWARE LTD., Beijing (CN); LENOVO (BEIJING) CO., LTD., Beijing (CN)

(72) Inventors: Tao Sun, Beijing (CN); Zhenhua Zhang, Beijing (CN); Wenjun Gao, Beijing (CN); Ke Shang, Beijing (CN); Guang Yang, Beijing (CN)

(73) Assignees: BEIJING LENOVO SOFTWARE LTD., Beijing (CN); LENOVO (BEIJING) CO., LTD., Beijing (CN)

( * ) Notice: Subject to any disclaimer, the term of this patent is extended or adjusted under 35 U.S.C. 154(b) by 343 days.

(21) Appl. No.: 14/286,066

(22) Filed: May 23, 2014

(65) Prior Publication Data

US 2015/0046505 A1 Feb. 12, 2015

(30) Foreign Application Priority Data

Aug. 7, 2013 (CN) .......................... 2013 1 0342264
Sep. 29, 2013 (CN) .......................... 2013 1 0455092

(51) Int. Cl.
*G06F 7/00* (2006.01)
*G09G 5/00* (2006.01)
*G09G 3/00* (2006.01)

(52) U.S. Cl.
CPC ................. *G09G 5/00* (2013.01); *G09G 3/00* (2013.01); *G09G 2320/041* (2013.01);
(Continued)

(58) Field of Classification Search
CPC ........................................................ G09G 5/00
(Continued)

(56) References Cited

U.S. PATENT DOCUMENTS

2008/0078921 A1 4/2008 Yang et al.
2012/0235967 A1* 9/2012 Katoh .................... G06F 3/042
345/207

(Continued)

FOREIGN PATENT DOCUMENTS

CN 1912987 2/2007
CN 102479499 5/2012
CN 103021337 4/2013

OTHER PUBLICATIONS

Chinese Patent Application No. CN 201310455092.8, Chinese Patent Office, First Office Action issued on Jun. 3, 2016; 12 pages.

(Continued)

*Primary Examiner* — Tan V. Mai
(74) *Attorney, Agent, or Firm* — Peter Su; Dentons US LLP

(57) ABSTRACT

An information processing method and an electronic device, the method comprising: acquiring a first value of a first parameter by the first sensor; acquiring a second value of the first parameter by the second sensor; judging whether a difference value between the first value and the second value is larger than or equal to a first threshold or not; determining a third value based on a first algorithm, the first value and the second value, and reporting the third value as a value of the first parameter to the processing unit, when the difference value is larger than or equal to the first threshold; determining a fourth value based on a second algorithm, the first value and the second value, and reporting the fourth value as the value of the first parameter to the processing unit, when the difference value is smaller than the first threshold.

16 Claims, 5 Drawing Sheets

(52) U.S. Cl.
CPC ............... *G09G 2320/0626* (2013.01); *G09G 2320/0666* (2013.01); *G09G 2360/144* (2013.01)

(58) Field of Classification Search
USPC .......................................................... 708/202
See application file for complete search history.

(56) References Cited

U.S. PATENT DOCUMENTS

| | | | | |
|---|---|---|---|---|
| 2013/0088523 | A1 | 4/2013 | Wu | |
| 2014/0241740 | A1* | 8/2014 | Naruse ................. | G03G 15/205 399/33 |

OTHER PUBLICATIONS

English Text Translation of First Office Action for Chinese Patent Application No. CN 201310455092.8, Chinese Patent Office, First Office Action issued on Jun. 3, 2016; 13 pages.
English Text Translation of Chinese Patent Application No. CN1912987 (A), published on Feb. 14, 2007, Liu Gequn; 6 pages.
English Text Translation of Chinese Patent Application No. CN103021337 (A), published on Apr. 3, 2013, Gao Yanhua; 5 pages.
English Text Translation of Chinese Patent Application No. CN102479499 (A), published on May 30, 2012, Inventec Corp; 9 pages.
Chinese Patent Application No. CN 201310455092.8, Chinese Patent Office, Second Office Action issued on Jan. 23, 2017; 9 pages.
English Text Translation of Second Office Action for Chinese Patent Application No. CN 201310455092.8, Chinese Patent Office, Second Office Action issued on Jan. 23, 2017; 8 pages.

* cited by examiner

INFORMATION PROCESSING METHOD AND ELECTRONIC DEVICE

BACKGROUND

The present disclosure relates to the field of computer and embedded device, and more particularly to an information processing method and an electronic device.

With the increasing development of the technology, the electronic technology has been developed rapidly. There are increasingly more types of electronic products, and people enjoy various convenience brought about by the development of the technology. People currently can enjoy a comfortable life brought about by the development of the technology through the various types of electronic products. For example, the electronic device such as the cell phone has become an indispensable part in people's life. People can communicate with others by way of calling, messaging, or the like through the electronic device such as the cell phone.

The display screen of the current mobile device such as the cell phone, the PAD or the like is in a state of a high brightness due to its large display screen, resulting in large power consumption. Therefore, many mobile devices are set up with a function of enabling the display screen to adjust the brightness automatically.

Currently, the mobile devices supporting the display screen to adjust the brightness automatically mostly acquire the surrounding brightness by a light sensor so that the brightness of the display screen is set according to the surrounding brightness. For example, when the surrounding brightness is light, the brightness value returned by the light sensor is large, and the mobile device increases the brightness of the display screen according to an automatic brightness adjustment algorithm. When the surrounding brightness is dark, the brightness value returned by the light sensor is small, and the mobile device decreases the brightness of the display screen according to the automatic brightness adjustment algorithm. Thus, not only the user requirement is met, but also the effect of power saving is achieved as well.

However, the current mobile device supporting the display screen to adjust the brightness automatically basically is arranged with just one light sensor. The light sensor therefore may be blocked inadvertently when the user is using the mobile device. At the present time, the light sensor is uanble to acquire the surrounding brightness signal normally, and the electronic device may set the brightness of the display screen to a value that does not match the current surrounding brightness. For example, if the surrounding brightness value is large, but the brightness value returned by the light sensor is smaller than the real surrounding brightness value since the light sensor is blocked, the mobile device may set the brightness value of the display screen to be small according to the brightness value returned by the light sensor.

Obviously, the reality of the acquired information is poor, resulting in that the accuracy of the adjustment result to the electronic device is poor.

Further, normally, various sensors are arranged on the display device to detect the surrounding light information, and the display situation of the display device (the display screen) is adjusted according to the surrounding light information detected by the sensor. For example, the surrounding light intensity (i.e., the brightness) may be measured by installing a surrounding light intensity sensor, and the surrounding light color temperature may be measured by installing a surrounding light color temperature sensor. However, in the current display device, the sensor for detecting the surrounding light information is normally installed at a side of the display screen. That is, the surrounding light information of only one side of the display screen can be detected. For example, the surrounding light intensity sensor and/or the surrounding light color temperature sensor are/is normally installed at one side of the display screen, i.e., the side facing the viewer.

However, in some application situations, possibly, the surrounding light information on the other side of the display screen is more important. In this situation, a good display effect may not be obtained by adjusting the display of the display screen with the surrounding light information detected by the sensor installed at only one side of the display screen.

Taking the surrounding light intensity sensor as an example, in the current display device, the surrounding light intensity sensor is normally installed at the side facing the viewer, and the display brightness of the display screen is adjusted according to the surrounding light intensity measured by the surrounding light intensity sensor. That is, the display brightness of the display screen is adjusted by the surrounding light brightness in the direction of the viewer measured by the surrounding light intensity sensor.

When the display device described above is in a backlight environment, for example, when a second plane of the display device has an illumination light source, the surrounding light intensity measured by the surrounding light intensity sensor installed at the side facing the viewer may be substantially smaller than the surrounding light intensity at the display screen. In this case, if the display brightness of the display screen is still adjusted according to the brightness light intensity measured by the surrounding light intensity sensor installed at the side facing the viewer, the display screen and the surrounding light will be contrary to each other in the human eye, making the display screen seem darker, and resulting in the decrease of the watching effect.

Therefore, there is a need of a method and an apparatus for adjusting the display screen according to real surrounding light information.

SUMMARY

Embodiments of the present disclosure provide an information processing method and an electronic device to solve the technical problem of a poor reality of the acquired information in the prior art.

An information processing method is applied to an electronic device having a first sensor, a second sensor and a processing unit, the method comprising acquiring a first value of a first parameter by the first sensor; acquiring a second value of a first parameter by the second sensor; judging whether a difference value between the first value and the second value is larger than or equal to a first threshold or not, to obtain a first judgment result; determining a third value of the first parameter based on a first algorithm, the first value and the second value, and reporting the third value as a value of the first parameter to the processing unit, when the first judgment result represents that the difference value is larger than or equal to the first threshold; determining a fourth value of the first parameter based on a second algorithm, the first value and the second value, and reporting the fourth value as the value of the first parameter to the processing unit, when the first judgment result represents that the difference value is smaller than the first threshold.

Optionally, the first algorithm takes the larger value between the first value and the second value as the third value.

Optionally, the second algorithm takes an average value of the first value and the second value as the third value.

Optionally, the first sensor is a first light sensor and the second sensor is a second light sensor; alternatively, the first sensor is a first temperature sensor and the second sensor is a second temperature sensor; or, the first sensor is a first capacitance sensor and the second sensor is a second capacitance sensor.

Optionally, the method further comprises taking the third value as a standard parameter value of the first parameter by the processing unit so that a second parameter of the electronic device is adjusted according to the standard parameter value, after reporting the third value as the value of the first parameter to the processing unit.

Optionally, the method further comprises taking the fourth value as a standard parameter value of the first parameter by the processing unit so that a second parameter of the electronic device is adjusted according to the standard parameter value, after reporting the fourth value as the value of the first parameter to the processing unit.

An electronic device has a first sensor, a second sensor and a processing unit, the electronic device further comprising a first acquiring module for acquiring a first value of a first parameter by the first sensor; a second acquiring module for acquiring a second value of a first parameter by the second sensor; a judging module for judging whether a difference value between the first value and the second value is larger than or equal to a first threshold or not, to obtain a first judgment result; a first determining module for determining a third value of the first parameter based on a first algorithm, the first value and the second value, and reporting the third value as a value of the first parameter to the processing unit, when the first judgment result represents that the difference value is larger than or equal to the first threshold; a second determining module for determining a fourth value of the first parameter based on a second algorithm, the first value and the second value, and reporting the fourth value as the value of the first parameter to the processing unit, when the first judgment result represents that the difference value is smaller than the first threshold.

Optionally, the first algorithm takes the larger value between the first value and the second value as the third value.

Optionally, the second algorithm takes an average value of the first value and the second value as the third value.

Optionally, the first sensor is a first light sensor and the second sensor is a second light sensor; alternatively, the first sensor is a first temperature sensor and the second sensor is a second temperature sensor; or, the first sensor is a first capacitance sensor and the second sensor is a second capacitance sensor.

Optionally, the electronic device further comprises an operating module for taking the third value as a standard parameter value of the first parameter by the processing unit so that a second parameter of the electronic device is adjusted according to the standard parameter value, after reporting the third value as the value of the first parameter to the processing unit.

Optionally, the electronic device further comprises an operating module for taking the fourth value as a standard parameter value of the first parameter by the processing unit so that a second parameter of the electronic device is adjusted according to the standard parameter value, after reporting the fourth value as the value of the first parameter to the processing unit.

According to an embodiment of the present disclosure, a method for adjusting a display screen is provided, comprising: detecting surrounding light information of the display screen by at least two sensors including at least one sensor installed at a first plane of the display screen and at least one sensor installed at a second plane of the display screen; and adjusting a display parameter setting of the display screen according to the surrounding light information detected by the at least two sensors.

The at least two sensors comprise at least two surrounding light intensity sensors, and the at least two surrounding light intensity sensors comprises at least one first surrounding light intensity sensor installed at the first plane of the display screen, and at least one second surrounding light intensity sensor installed at the second plane of the display screen.

The step of detecting surrounding light information of the display screen by the at least two sensors comprises detecting a first surrounding light intensity by the at least one first surrounding light intensity sensor, and detecting a second surrounding light intensity by the at least one second surrounding light intensity sensor; and the step of adjusting a display parameter setting of the display screen according to the surrounding light information detected by the at least two sensors comprises: adjusting the display brightness setting of the display screen according to the first surrounding light intensity and the second surrounding light intensity.

The maximum value between the first surrounding light intensity and the second surrounding light intensity, or the average value or the weighted average value of the first surrounding light intensity and the second surrounding light intensity is determined as the surrounding light intensity for adjustment, and the display intensity setting is adjusted according to the surrounding light intensity for adjustment.

The at least two sensors comprise at least two surrounding light color temperature sensors, and the at least two surrounding light color temperature sensors comprises at least one first surrounding light color temperature sensor installed at the first plane of the display screen, and at least one second surrounding light color temperature sensor installed at the second plane of the display screen.

The step of detecting surrounding light information of the display screen by the at least two sensors comprises: detecting a first surrounding light color temperature by the at least one first surrounding light color temperature sensor, and detecting a second surrounding light color temperature by the at least one second surrounding light color temperature sensor; and the step of adjusting a display parameter setting of the display screen according to the surrounding light information detected by the at least two sensors comprises: adjusting the display color temperature setting of the display screen according to the first surrounding light color temperature and the second surrounding light color temperature.

The maximum value between the first surrounding light color temperature and the second surrounding light color temperature, or the average value or the weighted average value of the first surrounding light color temperature and the second surrounding light color temperature is determined as the surrounding light color temperature for adjustment, and the display color temperature setting is adjusted according to the surrounding light color temperature for adjustment.

According to another embodiment of the present disclosure, an apparatus for adjusting a display screen is provided, comprising: a surrounding light information acquiring unit for acquiring surrounding light information of the display screen detected by at least two sensors including at least one sensor installed at a first plane of the display screen and at least one sensor installed at a second plane of the display screen; and a display parameter adjusting unit for adjusting a display parameter setting of the display screen according to the surrounding light information detected by the at least two sensors.

The surrounding light information acquiring unit acquires surrounding light information detected by at least two surrounding light intensity sensors, and the at least two surrounding light intensity sensors comprises at least one first surrounding light intensity sensor installed at the first plane of the display screen, and at least one second surrounding light intensity sensor installed at the second plane of the display screen.

The display parameter adjusting unit determines a first surrounding light intensity according to at least one surrounding light intensity detected by the at least one first surrounding light intensity sensor, and determines a second surrounding light intensity according to at least one surrounding light intensity detected by the at least one second surrounding light intensity sensor; and the display parameter adjusting unit adjusts the display brightness setting of the display screen according to the first surrounding light intensity and the second surrounding light intensity.

The display parameter adjusting unit determines the maximum value between the first surrounding light intensity and the second surrounding light intensity, or the average value or the weighted average value of the first surrounding light intensity and the second surrounding light intensity as the surrounding light intensity for adjustment, and adjusts the display brightness setting according to the surrounding light intensity for adjustment.

The surrounding light information acquiring unit acquires surrounding light color temperature information detected by at least two surrounding light color temperature sensors, and the at least two surrounding light color temperature sensors comprises at least one first surrounding light color temperature sensor installed at the first plane of the display screen, and at least one second surrounding light color temperature sensor installed at the second plane of the display screen.

The display parameter adjusting unit determines a first surrounding light color temperature according to at least one surrounding light color temperature detected by the at least one first surrounding light color temperature sensor, and determines a second surrounding light color temperature according to at least one surrounding light color temperature detected by the at least one second surrounding light color temperature sensor; and the display parameter adjusting unit adjusts the display color temperature setting of the display screen according to the first surrounding light color temperature and the second surrounding light color temperature.

The display parameter adjusting unit determines the maximum value between the first surrounding light color temperature and the second surrounding light color temperature, or the average value or the weighted average value of the first surrounding light color temperature and the surrounding light color temperature as the surrounding light color temperature for adjustment, and adjusts the display color temperature setting according to the surrounding light color temperature for adjustment.

The information processing method in the embodiments of the present disclosure may be applied to an electronic device having a first sensor, a second sensor and a processing unit, the method comprising acquiring a first value of a first parameter by the first sensor; acquiring a second value of a first parameter by the second sensor; judging whether a difference value between the first value and the second value is larger than or equal to a first threshold or not, to obtain a first judgment result; determining a third value of the first parameter based on a first algorithm, the first value and the second value, and reporting the third value as a value of the first parameter to the processing unit, when the first judgment result represents that the difference value is larger than or equal to the first threshold; determining a fourth value of the first parameter based on a second algorithm, the first value and the second value, and reporting the fourth value as the value of the first parameter to the processing unit, when the first judgment result represents that the difference value is smaller than the first threshold.

In the embodiments of the present disclosure, the electronic device may have two sensors of the same type, acquire two values of the same parameter by the two sensors respectively, and compare the two values to determine the final value of the parameter which is possibly the value closest to the real value. With the method in the embodiments of the present disclosure, a relative real parameter value may be obtained, and a relatively accurate adjustment result may be obtained when adjusting the electronic device according to the parameter value.

For example, the electronic device may be a cell phone, and the two sensors may be both light sensors. That is, the cell phone may have a first light sensor and a second light sensor. In this way, even if one of the light sensors is blocked by the user's hand or other objects, for example, when the user plays a game and the first light sensor may be blocked by one hand of the user, but the second light sensor is not blocked, and the difference value between the first value and the second value will be larger than or equal to the first threshold, and the electronic device can acquire the surrounding brightness information by the parameter value acquired by the two sensors, so that it can make proper response according to the surrounding brightness information, avoiding the acquisition of the real surrounding brightness information from being affected by the light sensor being blocked, increasing the accuracy of the adjustment, and further avoiding a possible false response by the electronic device. With the method in the embodiments of the present disclosure, the effect of power saving is achieved, the user experience is improved, and the user requirement is met.

Further, with the method and apparatus for adjusting the display screen according to the embodiments of the present disclosure, the surrounding light information of the display screen is detected by the sensors installed at two sides of the display screen, and the display parameter setting of the display screen is adjusted according to the surrounding light information, so that the display of the display screen may adapt to the surrounding illumination situation of the display screen, and the display effect of the display screen is improved.

Other features and advantages of the present disclosure will be described in the following description, and will be apparent partly from the description or be understood by the implementation of the present disclosure. The object and other advantages of the present disclosure may be realized and obtained by the structures pointed out particularly in the description, the claims and the drawings.

DETAILED DESCRIPTION

First Implementation

Figure 1:
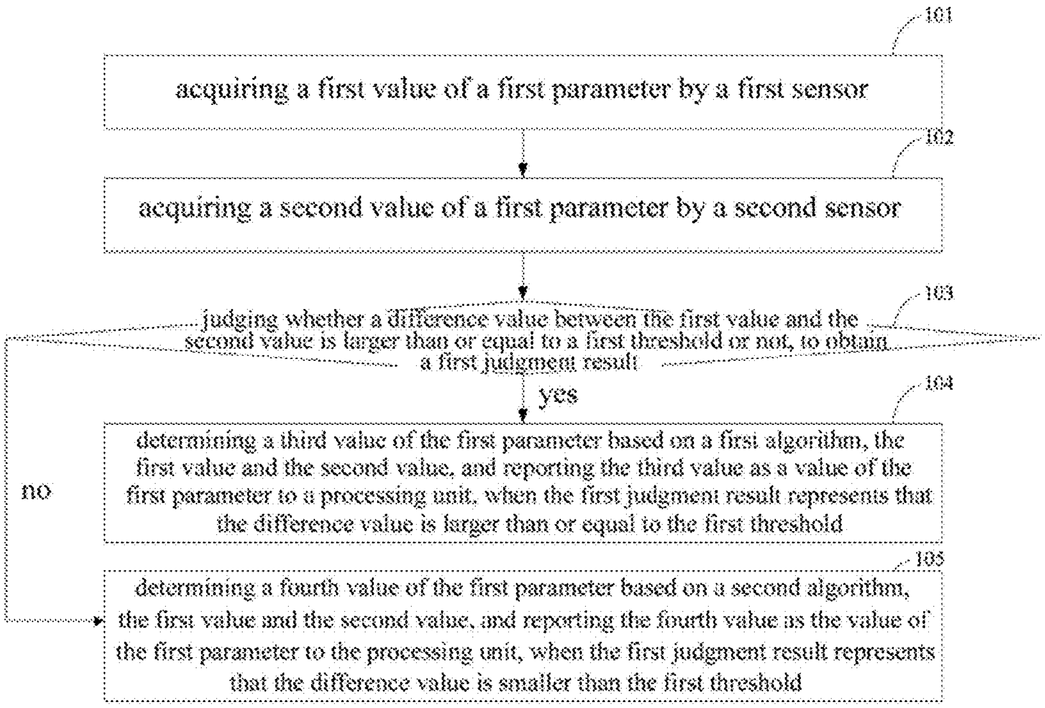
FIG. 1 is a main flowchart of an information processing method in an embodiment of the present disclosure.

The information processing method in the embodiments of the present disclosure may be applied to an electronic device having a first sensor, a second sensor and a processing unit, the method comprising the steps of: acquiring a first value of a first parameter by the first sensor; acquiring a second value of a first parameter by the second sensor; judging whether a difference value between the first value and the second value is larger than or equal to a first threshold or not, to obtain a first judgment result; determining a third value of the first parameter based on a first algorithm, the first value and the second value, and reporting the third value as a value of the first parameter to the processing unit, when the first judgment result represents that the difference value is larger than or equal to the first threshold; determining a fourth value of the first parameter based on a second algorithm, the first value and the second value, and reporting the fourth value as the value of the first parameter to the processing unit, when the first judgment result represents that the difference value is smaller than the first threshold.

In the embodiments of the present disclosure, the electronic device may have two sensors of the same type, acquire two values of the same parameter through the two sensors respectively, and compare the two values to determine the final value of the parameter which is possibly the value closest to the real value. With the method in the embodiments of the present disclosure, a relative real parameter value may be obtained, and a relatively accurate adjustment result may be obtained when adjusting the electronic device according to the parameter value.

For example, the electronic device may be a cell phone, and the two sensors may be both light sensors. That is, the cell phone may have a first light sensor and a second light sensor. In this way, even if one of the light sensors is blocked by the user's hand or other objects, for example, when the user plays a game and the first light sensor may be blocked by one hand of the user, but the second light sensor is not blocked, and the difference value between the first value and the second value will be larger than or equal to the first threshold, and the electronic device can acquire the surrounding brightness information by the parameter value acquired by the two sensors, so that it can make proper response according to the surrounding brightness information, avoiding the acquisition of the real surrounding brightness information from being affected by the light sensor being blocked, increasing the accuracy of the adjustment, and further avoiding a possible false response by the electronic device. With the method in the embodiments of the present disclosure, the effect of power saving is achieved, the user experience is improved, and the user requirement is met.

In order to make the object, the solution and the advantage of the embodiments of the present disclosure more clear, the technical solutions in the embodiments of the present disclosure will be described clearly and thoroughly with reference to the figures in the embodiments of the present disclosure. Obviously, the described embodiments are only a part of, but not all, the embodiments of the present disclosure. All the other embodiments obtained by those of ordinary skill in the art without any inventive labor based on the embodiments of the present disclosure shall fall within the scope of the present disclosure.

In the embodiments of the present disclosure, the electronic device may be various electronic devices such as a PC (personal computer), a notebook, a PAD (tablet computer), a cell phone or the like, which is not limited thereto.

Furthermore, the term "and/or" in the description only means a relationship between related objects, and represents that there may be three relationships. For example, the expression of "A and/or B" may represent a case in which A exists alone, a case in which A and B exist and a case in which B exists alone. Furthermore, the character "/" in the description normally means the related objects before and after the character are of a relationship of "or".

In the following, the embodiments of the present disclosure will be described in detail with reference to the figures.

First Embodiment

With reference to FIG. 1, an information processing method is provided in an embodiment of the present disclosure, which is applied to an electronic device having a first sensor, a second sensor and a processing unit. The main flow of the method is as follows.

At step 101, a first value of a first parameter is acquired by the first sensor.

Optionally, in an embodiment of the present disclosure, the first sensor may be a first light sensor and the second sensor may be a second light sensor; or, the first sensor may be a first temperature sensor and the second sensor may be a second temperature sensor; or, the first sensor may be a first capacitance sensor and the second sensor may be a second capacitance sensor; and so on.

Then, if the first sensor is the first light sensor and the second sensor is the second light sensor, the first parameter may be a light intensity parameter, e.g., a surrounding light intensity parameter. If the first sensor is the first capacitance sensor and the second sensor is the second capacitance sensor, the first parameter may be a capacitor parameter, e.g., a surrounding capacitor parameter. If the first sensor is the first temperature sensor and the second sensor is the second temperature sensor, the first parameter may be a temperature parameter, e.g., a surrounding temperature parameter, and so on.

At step S102, a second value of a first parameter is acquired by the second sensor.

In an embodiment of the present disclosure, it is possible to acquire the first value of the first parameter by the first sensor and acquire the second value of the first parameter by the second sensor at the same time. Alternatively, it is also possible to acquire the first value of the first parameter by the first sensor first, and then acquire the second value of the first parameter by the second sensor. Alternatively, it is also possible to acquire the second value of the first parameter by the second sensor first, and then acquire the first value of the first parameter by the first sensor.

At step 103, it is judged whether a difference value between the first value and the second value is larger than or equal to a first threshold or not, to obtain a first judgment result, wherein step 104 is performed when the difference value is larger than or equal to the first threshold, and step 105 is performed when the difference value is smaller than the first threshold.

In an embodiment of the present disclosure, the electronic device may process the first value and the second value after acquiring the same, for example, may acquire the difference value between the first value and the second value. After obtaining the difference value between the first value and the second value, the relationship between the difference value and the first threshold may be judged. For example, it may be judged whether the difference value is larger than or equal to the first threshold or not to obtain the first judgment result according to the judgment process. Then, the first judgment result may represent that the difference value is larger than or equal to the first threshold, or the first judgment result may represent that the difference value is smaller than the first threshold.

At step 104, a third value of the first parameter is determined based on a first algorithm, the first value and the second value, and the third value is reported as a value of the first parameter to the processing unit, when the first judgment result represents that the difference value is larger than or equal to the first threshold.

In an embodiment of the present disclosure, if the first judgment result represents that the difference value is larger than or equal to the first threshold, the electronic device may determine the third value of the first parameter based on the first algorithm, the first value and the second value, and may report the third value to the processing unit after determining the third value.

For example, the processing unit may be a CPU (central processing unit) of the electronic device, or may be a MCU (micro processor) of the electronic device or the like.

In an embodiment of the present disclosure, for example, the first algorithm takes the larger value between the first value and the second value as the third value. For example, if the first value is larger than the second value, the first value may be taken as the third value.

Optionally, in an embodiment of the present disclosure, the smaller value between the first value and the second value may be deleted after the third value is determined. For example, if the second value is larger than the first value, the second value may be taken as the third value, and the first value may be deleted after the second value is determined as the third value. In this way, the storage space of the electronic device may be saved.

In an embodiment of the present disclosure, for example, if the first sensor is the first light sensor and the second sensor is the second light sensor, when the difference value between the first value and the second value is larger than or equal to the first threshold, it is very possible that one of the first light sensor and the second light sensor is blocked by an obstacle. Then, it is natural that the light sensor which acquires the smaller value is the light sensor blocked by the obstacle, and the value acquired by the light sensor which is not blocked by the obstacle is obviously more close to the real parameter value. Therefore, the larger value between the first value and the second value may be taken as the third value, so that the determined parameter value is more close to the real parameter value, and the accuracy of the acquired parameter value is improved.

Further, in another embodiment of the present disclosure, after reporting the third value as the value of the first parameter to the processing unit, the electronic device may take the third value as a standard parameter value of the first parameter by the processing unit.

Further, in another embodiment of the present disclosure, after taking the third value as a standard parameter value of the first parameter by the processing unit, the electronic device may adjust a second parameter of the electronic device according to the standard parameter value.

For example, the electronic device may have a display unit. If the first parameter is the light intensity parameter, the second parameter may be a display parameter of the display unit. After taking the third value as a standard parameter value of the first parameter by the processing unit, the electronic device may adjust the value of the display parameter according to the third value of the first parameter. That is, the electronic device may adjust the display parameter of the display unit automatically according to the acquired surrounding light intensity, so that the display effect of the display unit may vary with the surrounding light intensity to achieve the power saving effect as much as possible.

At step 105, a fourth value of the first parameter is determined based on a second algorithm, the first value and the second value, and the fourth value is reported as the value of the first parameter to the processing unit, when the first judgment result represents that the difference value is smaller than the first threshold.

In an embodiment of the present disclosure, if the first judgment result represents that the difference value is smaller than the first threshold, the electronic device may determine the fourth value of the first parameter based on the second algorithm, the first value and the second value, and may report the fourth value to the processing unit after determining the fourth value.

In an embodiment of the present disclosure, for example, the second algorithm takes the average value of the first value and the second value as the fourth value, wherein when averaging, the arithmetic average value or the weighted average value of the first value and the second value may be taken.

Optionally, in an embodiment of the present disclosure, the first value and the second value may be deleted after the fourth value is determined. In this way, the storage space of the electronic device may be saved as much as possible.

Further, in another embodiment of the present disclosure, after reporting the fourth value as the value of the first parameter to the processing unit, the electronic device may take the fourth value as a standard parameter value of the first parameter by the processing unit.

In an embodiment of the present disclosure, for example, if the first sensor is the first light sensor and the second sensor is the second light sensor, when the difference value between the first value and the second value is smaller than the first threshold, it is very possible that none of the first light sensor and the second light sensor is blocked by an obstacle. Then, it may be considered that the values acquired by both light sensors are close to the real parameter value.

Therefore, in an embodiment of the present disclosure, the second algorithm may take any one of the first value and the second value as the fourth value.

Optionally, in an embodiment of the present disclosure, in order to be more accurate, the second algorithm may take the average value of the first value and the second value as the fourth value, so that the determined parameter value may be more close to the real parameter value, and the accuracy of the acquired parameter value may be improved.

Further, in another embodiment of the present disclosure, after taking the fourth value as a standard parameter value of the first parameter by the processing unit, the electronic device may adjust a second parameter of the electronic device according to the standard parameter value.

For example, the electronic device may have a display unit. If the first parameter is the light intensity parameter, the second parameter may be a display parameter of the display unit. After taking the fourth value as a standard parameter value of the first parameter by the processing unit, the electronic device may adjust the value of the display parameter according to the fourth value of the first parameter. That is, the electronic device may adjust the display parameter of the display unit automatically according to the acquired surrounding light intensity, so that the display effect of the display unit may vary with the surrounding light intensity to achieve the power saving effect as much as possible.

In the embodiment of the present disclosure, the reason for the determined standard parameter value being accurate is that the real brightness value of the surrounding is obtained by two light sensors. Therefore, by adjusting the display parameter of the display unit according to the standard parameter value, the light emitted by the display unit may adapt to the surroundings, the display quality of the display unit is good, and good watching light is provided to the user.

For example, if the standard parameter value is high, representing that the surrounding brightness is strong, the electronic device may set the value of the display parameter to be high correspondingly, so that it avoids the user from viewing the screen vaguely due to the strong surrounding light. If the standard parameter value is low, representing that the surrounding brightness is weak, the electronic device may set the value of the display parameter to be low correspondingly, so that it avoids the user's eye from being hurt by the strong light emitted by the display screen.

In the following, the information processing method and the electronic device in the disclosure will be described by way of some embodiments. The following embodiments are mainly used to introduce several possible application scenes of the method. It is to be noted that the embodiments of the present disclosure is only used to construe, but not limit, the present disclosure. All the embodiments consistent with the idea of the present disclosure shall fall within the protection scope of the present disclosure. Those skilled in the art naturally know how to modify based on the idea of the present disclosure.

Second Embodiment

The electronic device is a cell phone having a first light sensor, a second light sensor and a processing unit. Optionally, the first light sensor and the second light sensor are arranged at different locations of the cell phone. In this way, when one light sensor is blocked by the obstacle, the other light sensor can be ensured not to be blocked at the same time as much as possible.

In the embodiment of the present disclosure, it is possible to acquire the first value of the first parameter by the first sensor and acquire the second value of the first parameter by the second sensor at the same time. For example, the first parameter is the surrounding light intensity parameter.

After obtaining the first value and the second value, the electronic device may process the first value and the second value, for example, may acquire the difference value between the first value and the second value. After obtaining the difference value between the first value and the second value, the relationship between the difference value and the first threshold may be judged. For example, it may be judged whether the difference value is larger than or equal to the first threshold to obtain the first judgment result.

In an embodiment of the present disclosure, if the first judgment result represents that the difference value is larger than or equal to the first threshold, the electronic device may determine the third value of the first parameter based on the first algorithm, the first value and the second value, and may report the third value to the processing unit after determining the third value.

In an embodiment of the present disclosure, the processing unit may be a CPU of the electronic device.

In an embodiment of the present disclosure, for example, the first algorithm takes the larger value between the first value and the second value as the third value.

For example, in an embodiment of the present disclosure, if the first value is larger than the second value, the first value may be taken as the third value.

Optionally, in an embodiment of the present disclosure, the smaller value between the first value and the second value may be deleted after the third value is determined. In this way, the storage space of the electronic device may be saved as much as possible.

When the difference value between the first value and the second value is larger than or equal to the first threshold, it is very possible that one of the first light sensor and the second light sensor is blocked by an obstacle. Then, it is natural that the light sensor which acquires the smaller value is the light sensor blocked by the obstacle, and the value acquired by the light sensor which is not blocked by the obstacle is obviously more close to the real parameter value. Therefore, the larger value between the first value and the second value may be taken as the third value, so that the determined parameter value is more close to the real parameter value, and the accuracy of the acquired parameter value is improved.

After reporting the third value as the value of the first parameter to the processing unit, the electronic device may take the third value as a standard parameter value of the first parameter by the processing unit. After taking the third value as a standard parameter value of the first parameter by the processing unit, the electronic device may adjust a second parameter of the electronic device according to the standard parameter value.

For example, the electronic device may have a display unit. The second parameter may be a display parameter of the display unit. After taking the third value as a standard parameter value of the first parameter by the processing unit, the electronic device may adjust the value of the display parameter according to the third value of the first parameter. That is, the electronic device may adjust the display parameter of the display unit automatically according to the acquired surrounding light intensity, so that the display effect of the display unit may vary with the surrounding light intensity to achieve the power saving effect as much as possible.

Third Embodiment

The electronic device is a cell phone having a first temperature sensor, a second temperature sensor and a processing unit. Optionally, the first temperature sensor and the second temperature sensor are arranged at different locations of the cell phone. In this way, when one temperature sensor is blocked by the obstacle, the other temperature sensor can be ensured not to be blocked at the same time as much as possible.

In the embodiment of the present disclosure, it is possible to acquire the first value of the first parameter by the first sensor and acquire the second value of the first parameter by the second sensor at the same time. For example, the first parameter is the surrounding temperature parameter.

After obtaining the first value and the second value, the electronic device may process the first value and the second value, for example, may acquire the difference value between the first value and the second value. After obtaining the difference value between the first value and the second value, the relationship between the difference value and the first threshold may be judged. For example, it may be judged whether the difference value is larger than or equal to the first threshold to obtain the first judgment result.

In an embodiment of the present disclosure, if the first judgment result represents that the difference value is smaller than the first threshold, the electronic device may determine the fourth value of the first parameter based on the second algorithm, the first value and the second value, and may report the fourth value to the processing unit after determining the fourth value.

In an embodiment of the present disclosure, the processing unit may be a CPU of the electronic device.

In an embodiment of the present disclosure, for example, the second algorithm takes the average value of the first value and the second value as the fourth value.

In an embodiment of the present disclosure, the second algorithm takes the arithmetic average value of the first value and the second value as the fourth value.

Optionally, in an embodiment of the present disclosure, the first value and the second value may be deleted after the fourth value is determined. In this way, the storage space of the electronic device may be saved as much as possible.

When the difference value between the first value and the second value is smaller than the first threshold, it is very possible that none of the first temperature sensor and the second temperature sensor is blocked by an obstacle. Then, it may be considered that the values acquired by both temperature sensors are close to the real parameter value.

After reporting the fourth value as the value of the first parameter to the processing unit, the electronic device may take the fourth value as the standard parameter value of the first parameter by the processing unit. After taking the fourth value as the standard parameter value of the first parameter by the processing unit, the electronic device may adjust the second parameter of the electronic device according to the standard parameter value.

For example, the electronic device may have a radiator unit. The second parameter may be a radiation parameter of the radiator unit. After taking the fourth value as a standard parameter value of the first parameter by the processing unit, the electronic device may adjust the value of the radiation parameter according to the fourth value of the first parameter. That is, the electronic device may adjust the radiation parameter of the radiator unit automatically according to the acquired surrounding temperature to make the radiation effect of the radiator unit change with the surrounding temperature so as to protect the electronic device as much as possible.

Fourth Embodiment

The electronic device is a cell phone having a first capacitance sensor, a second capacitance sensor and a processing unit. Optionally, the first capacitance sensor and the second capacitance sensor are arranged at different locations of the cell phone. In this way, when one capacitance sensor is blocked by the obstacle, the other capacitance sensor can be ensured not to be blocked at the same time as much as possible.

In the embodiment of the present disclosure, it is possible to acquire the first value of the first parameter by the first sensor and acquire the second value of the first parameter by the second sensor at the same time. For example, the first parameter is the surrounding light intensity parameter.

After obtaining the first value and the second value, the electronic device may process the first value and the second value, for example, may acquire the difference value between the first value and the second value. After obtaining the difference value between the first value and the second value, the relationship between the difference value and the first threshold may be judged. For example, it may be judged whether the difference value is larger than or equal to the first threshold to obtain the first judgment result.

For example, the first value is 1000, the second value is 10 and the first threshold is 100, then the difference value is 990.

Obviously, in the embodiment of the present disclosure, the first judgment result represents that the difference value is larger than or equal to the first threshold. The electronic device may determine the third value of the first parameter based on the first algorithm, the first value and the second value, and may report the third value to the processing unit after determining the third value.

In an embodiment of the present disclosure, the processing unit may be a CPU of the electronic device.

In an embodiment of the present disclosure, for example, the first algorithm takes the larger value between the first value and the second value as the third value.

For example, if the first value is larger than the second value, the first value may be taken as the third value.

Optionally, in an embodiment of the present disclosure, the smaller value between the first value and the second value may be deleted after the third value is determined. In this way, the storage space of the electronic device may be saved as much as possible.

When the difference value between the first value and the second value is larger than or equal to the first threshold, it is very possible that one of the first capacitance sensor and the second capacitance sensor is broken or interfered with another electronic device. Then, it is natural that the capacitance sensor which acquires the smaller value is the capacitance sensor which is broken or interfered, and the value acquired by the capacitance sensor which is not broken or interfered is obviously more close to the real parameter value. Therefore, the larger value between the first value and the second value may be taken as the third value, so that the determined parameter value is more close to the real parameter value, and the accuracy of the acquired parameter value is improved.

After reporting the third value as the value of the first parameter to the processing unit, the electronic device may take the third value as a standard parameter value of the first parameter by the processing unit. After taking the third value as a standard parameter value of the first parameter by the processing unit, the electronic device may adjust a second parameter of the electronic device according to the standard parameter value.

Fifth Embodiment

Figure 2:
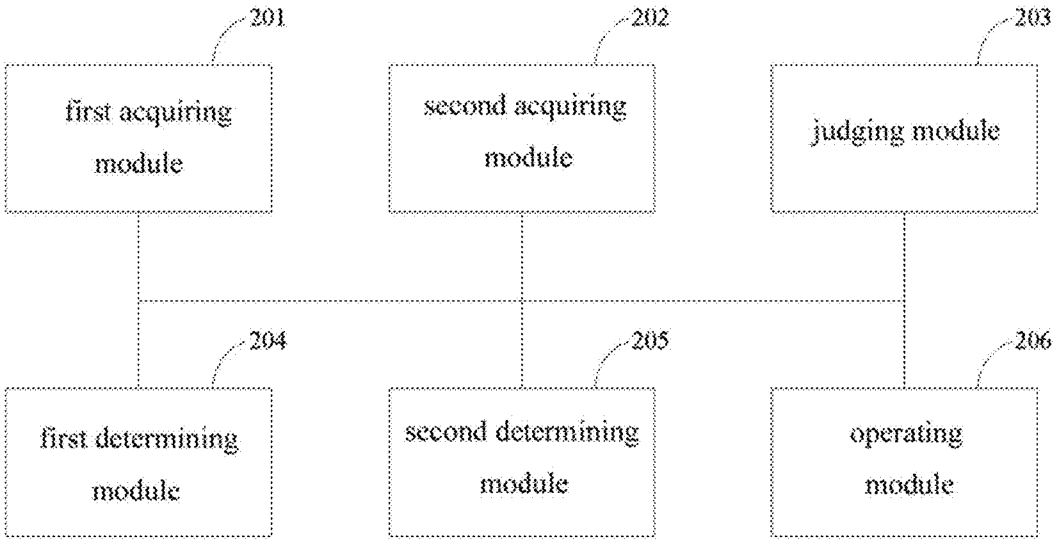
FIG. 2 is a structural diagram of an electronic device in an embodiment of the present disclosure.

Referring to FIG. 2, an electronic device is provided in an embodiment of the present disclosure, having a first sensor, a second sensor and a processing unit, the electronic device further comprising: a first acquiring module 201, a second acquiring module 202, a judging module 203, a first determining module 204 and a second determining module 205.

Optionally, the electronic device may further comprise an operating module 206.

The first acquiring module 201 may be used for acquiring a first value of a first parameter by the first sensor.

The second acquiring module 202 may be used for acquiring a second value of a first parameter by the second sensor.

The judging module 203 may be used for judging whether a difference value between the first value and the second value is larger than or equal to a first threshold or not, to obtain a first judgment result.

The first determining module 204 may be used for determining a third value of the first parameter based on a first algorithm, the first value and the second value, and reporting the third value as a value of the first parameter to the processing unit, when the first judgment result represents that the difference value is larger than or equal to the first threshold.

The second determining module 205 may be used for determining a fourth value of the first parameter based on a second algorithm, the first value and the second value, and reporting the fourth value as the value of the first parameter to the processing unit, when the first judgment result represents that the difference value is smaller than the first threshold.

In an embodiment of the present disclosure, the first algorithm takes the larger value between the first value and the second value as the third value.

In an embodiment of the present disclosure, the second algorithm takes an average value of the first value and the second value as the third value.

In an embodiment of the present disclosure, the first sensor is a first light sensor and the second sensor is a second light sensor; or, the first sensor is a first temperature sensor and the second sensor is a second temperature sensor; or, the first sensor is a first capacitance sensor and the second sensor is a second capacitance sensor.

The operating module 206 may be used for taking the third value as a standard parameter value of the first parameter by the processing unit so that a second parameter of the electronic device is adjusted according to the standard parameter value.

The operating module 206 may be used for taking the fourth value as a standard parameter value of the first parameter by the processing unit so that a second parameter of the electronic device is adjusted according to the standard parameter value.

The information processing method in the embodiments of the present disclosure may be applied to an electronic device having a first sensor, a second sensor and a processing unit, the method comprising the steps of: acquiring a first value of a first parameter by the first sensor; acquiring a second value of a first parameter by the second sensor; judging whether a difference value between the first value and the second value is larger than or equal to a first threshold or not, to obtain a first judgment result; determining a third value of the first parameter based on a first algorithm, the first value and the second value, and reporting the third value as a value of the first parameter to the processing unit, when the first judgment result represents that the difference value is larger than or equal to the first threshold; determining a fourth value of the first parameter based on a second algorithm, the first value and the second value, and reporting the fourth value as the value of the first parameter to the processing unit, when the first judgment result represents that the difference value is smaller than the first threshold.

In the embodiments of the present disclosure, the electronic device may have two sensors of the same type, acquire two values of the same parameter through the two sensors respectively, and compare the two values to determine the final value of the parameter which is possibly the value closest to the real value. With the method in the embodiments of the present disclosure, a relative real parameter value may be obtained, and a relatively accurate adjustment result may be obtained when adjusting the electronic device according to the parameter value.

For example, the electronic device may be a cell phone, and the two sensors may be both light sensors. That is, the cell phone may have a first light sensor and a second light sensor. In this way, even if one of the light sensors is blocked by the user's hand or other objects, for example, when the user plays a game and the first light sensor may be blocked by one hand of the user, but the second light sensor is not blocked, and the difference value between the first value and the second value will be larger than or equal to the first threshold, and the electronic device can acquire the surrounding brightness information by the parameter value acquired by the two sensors, so that it can make proper response according to the surrounding brightness information, avoiding the acquisition of the real surrounding brightness information from being affected by the light sensor being blocked, increasing the accuracy of the adjustment, and further avoiding a possible false response by the electronic device. With the method in the embodiments of the present disclosure, the effect of power saving is achieved, the user experience is improved, and the user requirement is met.

Second Implementation

Figure 3:
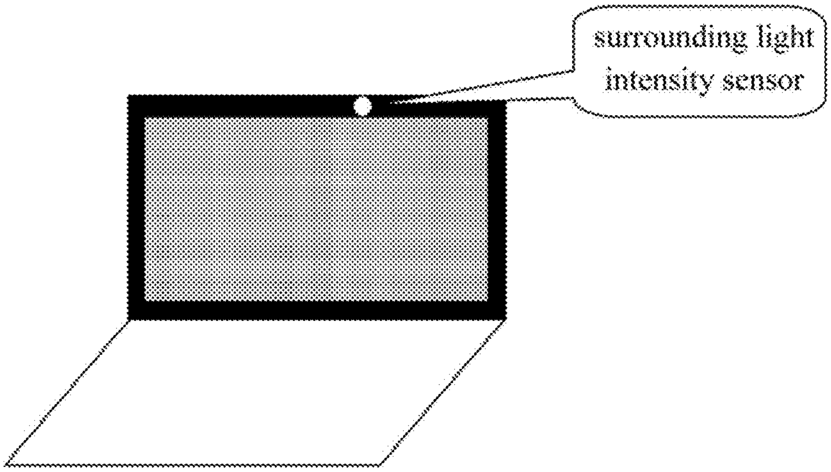
FIG. 3 is a schematic diagram showing an installed location of a conventional surrounding light intensity sensor.

As shown in FIG. 3, a schematic diagram showing an installed location of a conventional surrounding light intensity sensor is shown. The conventional surrounding light intensity sensor is installed at a side of the display screen facing the viewer. In the conventional display device, the display brightness of the display screen is adjusted according to the surrounding light intensity measured by the surrounding light intensity sensor.

Alternatively or additionally, a surrounding light color temperature sensor may be installed at the location where the surrounding light intensity sensor is installed as shown in FIG. 3. In the conventional display device, the display color temperature of the display screen is adjusted according to the surrounding light color temperature measured by the surrounding light color temperature sensor.

Figure 4A:
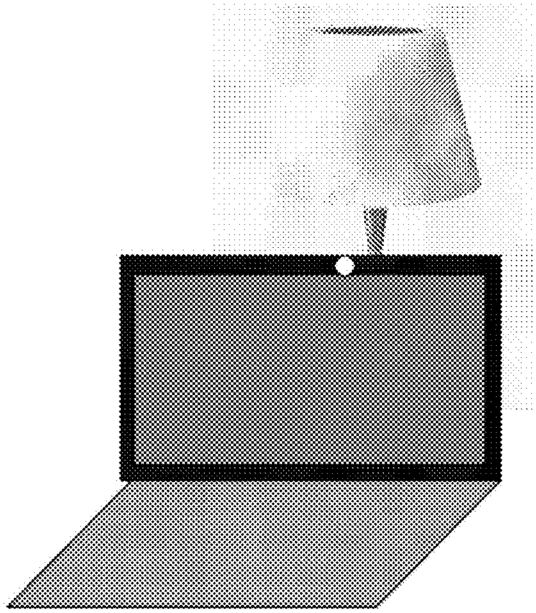
FIGS. 4A, 4B and 4C are three schematic diagrams showing a case in which an electronic device is in a backlight environment.
Figure 4B:
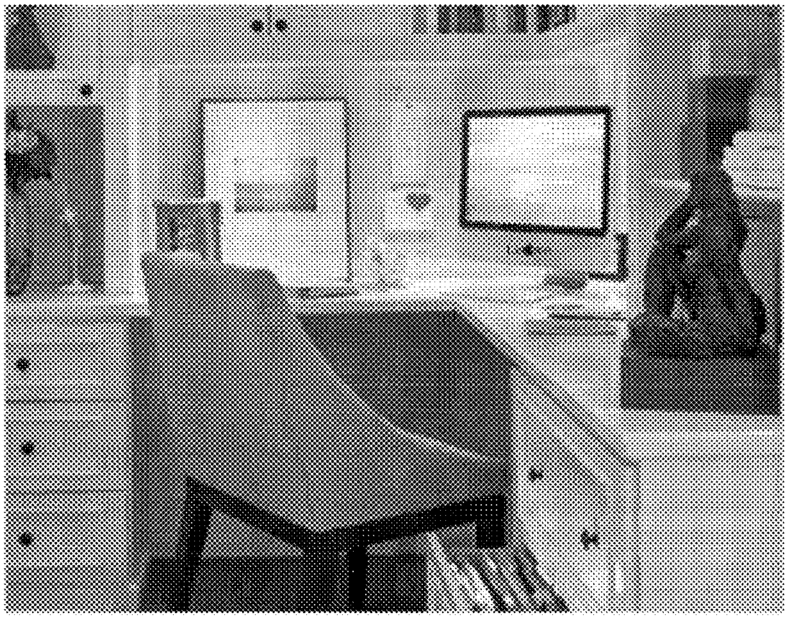
Figure 4C:
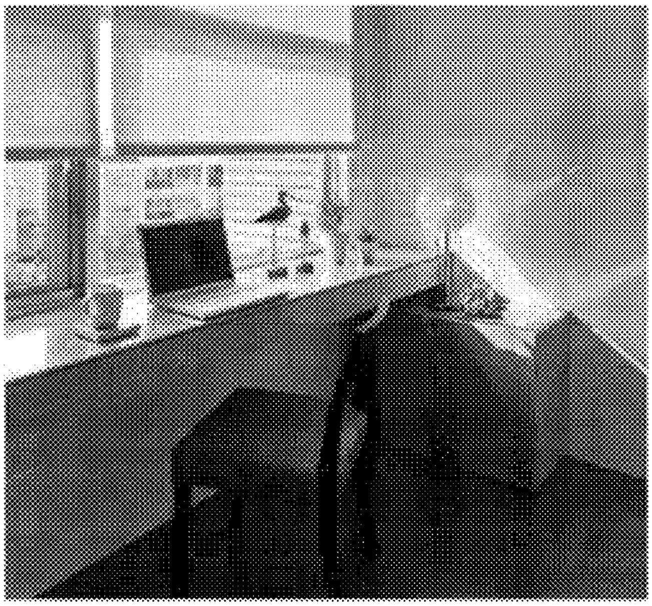

FIGS. 4A, 4B and 4C show three schematic diagrams in which the display device is in a backlight environment. In the backlight environment shown in FIGS. 4A-4C, if the display screen is still adjusted according to the surrounding light information measured by the surrounding light intensity sensor shown in FIG. 3, the display screen may looks darker compared to the surrounding light, resulting in a poor watching effect.

In order to overcome the above defect, it is proposed in the embodiment of the present disclosure that the surrounding light sensors are installed at different sides of the display screen (i.e., a first plane and a second plane of the screen), and the display parameter of the display screen is adjusted according to the surrounding light information measured by the surrounding light sensors installed at two sides of the display screen respectively. Here, the first plane may be the side of the display screen, and the second plane may be a back side of the device opposite to the screen. Optionally, in a complicated case, the second plane may be a third plane adjacently to the display screen. In this way, the light intensity sensor may be used to detect the light intensity of the light emitted from the upper side of the side of the screen, and output the screen light. In order to be better understood, only the embodiment of installing at the front surface and the back surface is pointed out in the embodiment of the present disclosure. The embodiment of installing at adjacent sides is similar to the content described above, and will not be described here in duplication.

Figure 5A:
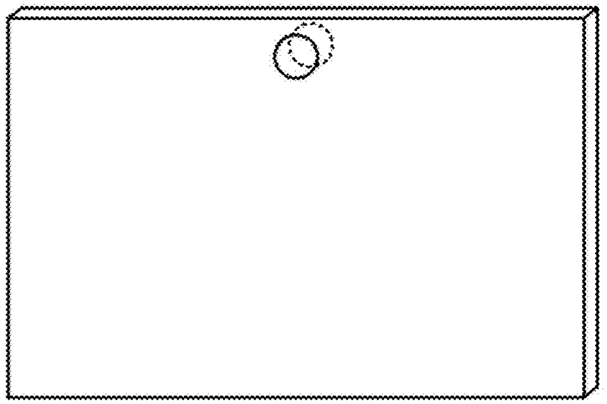
FIGS. 5A, 5B and 5C are schematic diagrams showing installed locations of surrounding light intensity sensors according to an embodiment of the present disclosure.

FIG. 5A is a schematic diagram showing a location in which the surrounding light sensors are installed according to an embodiment of the present disclosure, wherein one surrounding light sensor is installed at each of the two sides of the display screen respectively. Here, the surrounding light sensors may be one of the surrounding light intensity sensor and the surrounding light color temperature sensor, or both the surrounding light color temperature sensor and the surrounding light intensity sensor.

Figure 5B:
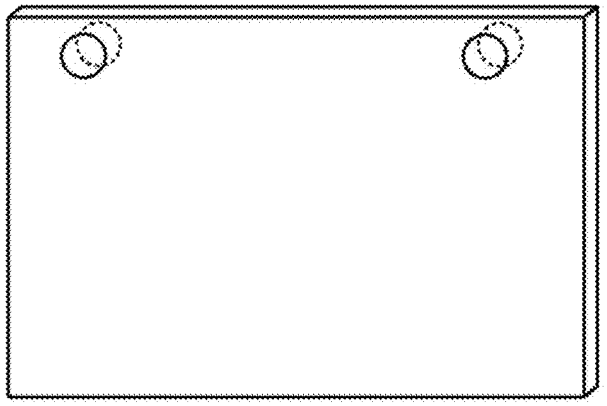
Figure 5C:
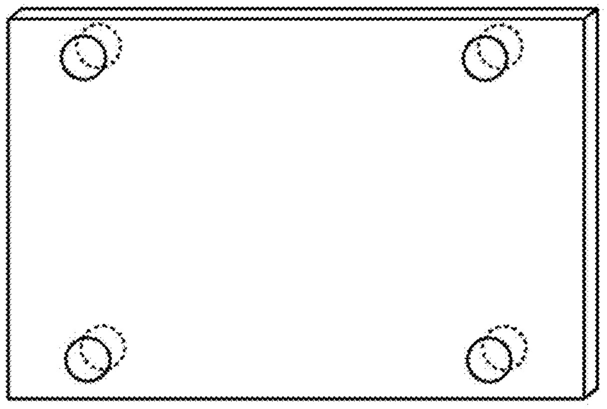

FIG. 5B is a schematic diagram showing another location in which the surrounding light sensors are installed according to an embodiment of the present disclosure, wherein two surrounding light sensors are installed at two sides of the display screen respectively. FIG. 5C is a schematic diagram showing another location in which the surrounding light sensors are installed according to an embodiment of the present disclosure, wherein fourth surrounding light sensors are installed at two sides of the display screen respectively. Same to FIG. 5A, the surrounding light sensor here may be one of the surrounding light intensity sensor and the surrounding light color temperature sensor, or may be both the surrounding light intensity sensor and the surrounding light color temperature sensor.

Figure 6:
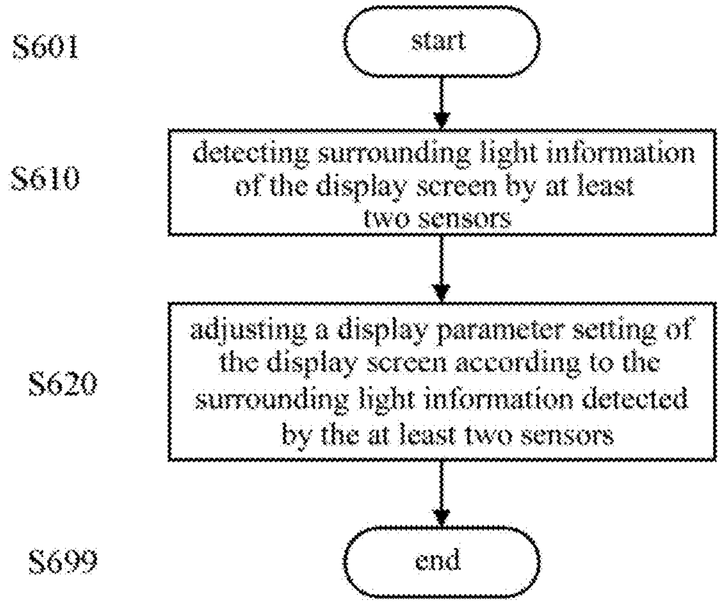
FIG. 6 is a schematic flowchart showing a method for adjusting a display screen according to an embodiment of the present disclosure.

The method 600 for adjusting a display screen according to an embodiment of the present disclosure will be described with reference to FIG. 6. The method 600 for adjusting a display screen according to an embodiment of the present disclosure is applied to a display device. FIG. 6 is a schematic flowchart showing the method 600 for adjusting a display screen according to an embodiment of the present disclosure.

As shown in FIG. 6, the method 600 for adjusting a display screen according to an embodiment of the present disclosure starts at step S601.

At step S610, the surrounding light information of the display screen is detected by at least two sensors including at least one sensor installed at a first plane of the display screen and at least one sensor installed at a second plane of the display screen.

The at least two sensors may comprise at least two surrounding light intensity sensors, and the at least two surrounding light intensity sensors may comprise at least one first surrounding light intensity sensor installed at the first plane of the display screen, and at least one second surrounding light intensity sensor installed at the second plane of the display screen.

Alternatively or additionally, the at least two sensors may comprise at least two surrounding light color temperature sensors, and the at least two surrounding light color temperature sensors may comprise at least one first surrounding light color temperature sensor installed at the first plane of the display screen, and at least one second surrounding light color temperature sensor installed at the second plane of the display screen.

At step S620, a display parameter setting of the display screen is adjusted according to the surrounding light information detected by the at least two sensors.

In the case of the at least two sensors including at least two surrounding light intensity sensors as described above, the maximum value between the at least two surrounding light intensities measured by the at least two surrounding light intensity sensors, or the average value or the weighted average value of the at least two surrounding light intensities measured by the at least two surrounding light intensity sensors may be used to adjust the display brightness setting of the display screen.

Alternatively, in this case, a first surrounding light intensity may be detected by the at least one first surrounding light intensity sensor, and a second surrounding light intensity may be detected by the at least one second surrounding light intensity sensor, and the display brightness setting of the display screen may be adjusted according to the first surrounding light intensity and the second surrounding light intensity.

In the case as shown in FIG. 5A, i.e., in the case in which there are one first surrounding light intensity sensor and one second surrounding light intensity sensor, the first surrounding light intensity may be the surrounding light intensity measured by the first surrounding light intensity sensor, and the second surrounding light intensity may be the surrounding light intensity measured by the second surrounding light intensity sensor.

In the case as shown in FIG. 5B or 5C, i.e., in the case in which there are at least two first surrounding light intensity sensors and at least two second surrounding light intensity sensors, the first surrounding light intensity may be the maximum value between at least two surrounding light intensities measured by the at least two first surrounding light intensity sensors, or the average value or the weighted average value of the at least two surrounding light intensities measured by the at least two first surrounding light intensity sensors. The second surrounding light intensity may be the maximum value between at least two surrounding light intensities measured by the at least two second surrounding light intensity sensors, or the average value or the weighted average value of the at least two surrounding light intensities measured by the at least two second surrounding light intensity sensors.

After obtaining the first surrounding light intensity and the second surrounding light intensity, the maximum value between the first surrounding light intensity and the second surrounding light intensity, or the average value or the weighted average value of the first surrounding light intensity and the second surrounding light intensity may be further determined as the surrounding light intensity for adjustment, and the display brightness setting of the display screen is adjusted according to the surrounding light intensity for adjustment.

On the other hand, in the case of the at least two sensors including at least two surrounding light color temperature sensors as described above, the maximum value between the at least two surrounding light color temperatures measured by the at least two surrounding light color temperature sensors, or the average value or the weighted average value of the at least two surrounding light color temperatures measured by the at least two surrounding light color temperature sensors may be used to adjust the display color temperature setting of the display screen.

Alternatively, in this case, a first surrounding light color temperature may be detected by the at least one first surrounding light color temperature sensor, and a second surrounding light color temperature may be detected by the at least one second surrounding light color temperature sensor, and the display color temperature setting of the display screen may be adjusted according to the first surrounding light color temperature and the second surrounding light color temperature.

In the case as shown in FIG. 5A, i.e., in the case in which there are one first surrounding light color temperature sensor and one second surrounding light color temperature sensor, the first surrounding light color temperature may be the surrounding light color temperature measured by the first surrounding light color temperature sensor, and the second surrounding light color temperature may be the surrounding light color temperature measured by the second surrounding light color temperature sensor.

In the case as shown in FIG. 5B or 5C, i.e., in the case in which there are at least two first surrounding light color temperature sensors and two second surrounding light color temperature sensors, the first surrounding light color temperature may be the maximum value between at least two surrounding light color temperatures measured by the at least two first surrounding light color temperature sensors, or the average value or the weighted average value of the at least two surrounding light color temperatures measured by the at least two first surrounding light color temperature sensors. The second surrounding light color temperature may be the maximum value between at least two surrounding light color temperatures measured by the at least two second surrounding light color temperature sensors, or the average value or the weighted average value of the at least two surrounding light color temperatures measured by the at least two second surrounding light color temperature sensors.

After obtaining the first surrounding light color temperature and the second surrounding light color temperature, the maximum value between the first surrounding light color temperature and the second surrounding light color temperature, or the average value or the weighted average value of the first surrounding light color temperature and the second surrounding light color temperature may be further determined as the surrounding light color temperature for adjustment, and the display color temperature setting is adjusted according to the surrounding light color temperature for adjustment.

The method for adjusting the display brightness of the display screen according to the surrounding light intensity for adjustment may be referred to the method for adjusting the display brightness of the display screen according to the surrounding light intensity measured by the surrounding light intensity sensor as shown in FIG. 5A in the prior art, and will not be described here to avoid redundancy. The method for adjusting the display color temperature of the display screen according to the surrounding light color temperature for adjustment may be referred to the method for adjusting the display color temperature of the display screen according to the surrounding light color temperature measured by the surrounding light color temperature sensor as shown in FIG. 5A in the prior art, and will not be described here to avoid redundancy.

It should be noted that the location where the surrounding light sensor is installed in the embodiments of the present disclosure is not limited to the cases shown in FIGS. 5A, 5B and 5C. The location on the first plane of the display screen where the surrounding light sensor is installed is not necessarily the same as that on the second plane of the display screen where the surrounding light sensor is installed. The number of the surrounding light sensors installed on the first plane of the display screen is not necessarily the same as that on the second plane of the display screen.

Figure 7:
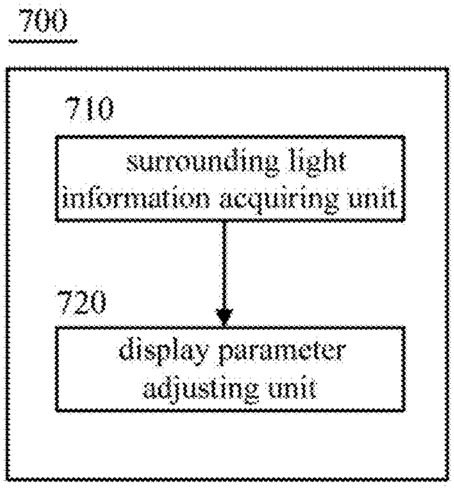
FIG. 7 is a schematic block diagram showing an apparatus for adjusting a display screen according to an embodiment of the present disclosure.

In the following, the apparatus 700 for adjusting the display screen according to an embodiment of the present disclosure will be described with reference to FIG. 7. FIG. 7 is a schematic flowchart showing the apparatus 700 for adjusting the display screen according to an embodiment of the present disclosure.

The apparatus 700 for adjusting the display screen according to an embodiment of the present disclosure is applied in a display device, and may include a surrounding light information acquiring unit 710 and a display parameter adjusting unit 720.

The surrounding light information acquiring unit 710 acquires surrounding light information of the display screen detected by at least two sensors including at least one sensor installed at a first plane of the display screen and at least one sensor installed at a second plane of the display screen.

The at least two sensors may include at least two surrounding light intensity sensors. The surrounding light information acquiring unit 710 may acquire surrounding light information detected by at least two surrounding light intensity sensors, and the at least two surrounding light intensity sensors comprises at least one first surrounding light intensity sensor installed at the first plane of the display screen, and at least one second surrounding light intensity sensor installed at the second plane of the display screen.

Alternatively or additionally, the at least two sensors may include at least two surrounding light color temperature sensors. The surrounding light information acquiring unit 710 may acquire surrounding light color temperature information detected by at least two surrounding light color temperature sensors, and the at least two surrounding light color temperature sensors comprises at least one first surrounding light color temperature sensor installed at the first plane of the display screen, and at least one second surrounding light color temperature sensor installed at the second plane of the display screen.

The display parameter adjusting unit 720 adjusts a display parameter setting of the display screen according to the acquired surrounding light information detected by the at least two sensors.

In the case in which the at least two sensors include at least two surrounding light intensity sensors, the display parameter adjusting unit 720 may adjust the display brightness setting of the display screen using the maximum value between the at least two surrounding light intensities measured by the at least two surrounding light intensity sensors, or the average value or the weighted average value of the at least two surrounding light intensities measured by the at least two surrounding light intensity sensors.

Alternatively, in this case, the display parameter adjusting unit 720 may determine a first surrounding light intensity according to at least one surrounding light intensity detected by the at least one first surrounding light intensity sensor, determine a second surrounding light intensity according to at least one surrounding light intensity detected by the at least one second surrounding light intensity sensor, and adjust the display brightness setting of the display screen according to the first surrounding light intensity and the second surrounding light intensity.

In the case as shown in FIG. 5A, i.e., in the case in which there are one first surrounding light intensity sensor and one second surrounding light intensity sensor, the surrounding light information acquiring unit 710 may acquire the first surrounding light intensity measured by the first surrounding light intensity sensor and the second surrounding light intensity measured by the second surrounding light intensity sensor. The display parameter adjusting unit 720 may take the surrounding light intensity measured by the first surrounding light intensity sensor as the first surrounding light intensity, and take the surrounding light intensity measured by the second surrounding light intensity sensor as the second surrounding light intensity.

In the case as shown in FIG. 5B or 5C, i.e., in the case in which there are at least two first surrounding light intensity sensors and at least two second surrounding light intensity sensors, the surrounding light information acquiring unit 710 may acquire at least two surrounding light intensities measured by the at least two first surrounding light intensity sensors, the display parameter adjusting unit 720 may take the maximum value between the at least two surrounding light intensities measured by the at least two first surrounding light intensity sensors, or the average value or the weighted average value of the at least two surrounding light intensities measured by the at least two first surrounding light intensity sensors as the first surrounding light intensity. Further, the surrounding light information acquiring unit 710 may acquire at least two surrounding light intensities measured by the at least two second surrounding light intensity sensors, the display parameter adjusting unit 720 may take the maximum value between the at least two surrounding light intensities measured by the at least two second surrounding light intensity sensors, or the average value or the weighted average value of the at least two surrounding light intensities measured by the at least two second surrounding light intensity sensors as the second surrounding light intensity.

After obtaining the first surrounding light intensity and the second surrounding light intensity, the display parameter adjusting unit 720 may further determine the maximum value between the first surrounding light intensity and the second surrounding light intensity, or the average value or the weighted average value of the first surrounding light intensity and the second surrounding light intensity as the surrounding light intensity for adjustment, and adjust the display brightness setting of the display screen according to the surrounding light intensity for adjustment.

On the other hand, in the case in which the at least two sensors include at least two surrounding light color temperature sensors, the display parameter adjusting unit 720 may adjust the display color temperature setting of the display screen using the maximum value between the at least two surrounding light color temperatures measured by the at least two surrounding light color temperature sensors, or the average value or the weighted average value of the at least two surrounding light color temperatures measured by the at least two surrounding light color temperature sensors.

Alternatively, in this case, the display parameter adjusting unit 720 may determine a first surrounding light color temperature according to at least one surrounding light color temperature detected by the at least one first surrounding light color temperature sensor, determine a second surrounding light color temperature according to at least one surrounding light color temperature detected by the at least one second surrounding light color temperature sensor, and adjust the display color temperature setting of the display screen according to the first surrounding light color temperature and the second surrounding light color temperature.

In the case as shown in FIG. 5A, i.e., in the case in which there are one first surrounding light color temperature sensor and one second surrounding light color temperature sensor, the surrounding light information acquiring unit 710 may acquire the first surrounding light color temperature measured by the first surrounding light color temperature sensor and the second surrounding light color temperature measured by the second surrounding light color temperature sensor. The display parameter adjusting unit 720 may take the surrounding light color temperature measured by the first surrounding light color temperature sensor as the first surrounding light color temperature, and take the surrounding light color temperature measured by the second surrounding light color temperature sensor as the second surrounding light color temperature.

In the case as shown in FIG. 5B or 5C, i.e., in the case in which there are at least two first surrounding light color temperature sensors and at least two second surrounding light color temperature sensors, the surrounding light information acquiring unit 710 may acquire at least two surrounding light color temperatures measured by the at least two first surrounding light color temperature sensors, the display parameter adjusting unit 720 may take the maximum value between the at least two surrounding light color temperatures measured by the at least two first surrounding light color temperature sensors, or the average value or the weighted average value of the at least two surrounding light color temperatures measured by the at least two first surrounding light color temperature sensors as the first surrounding light color temperature. Further, the surrounding light information acquiring unit 710 may acquire at least two surrounding light color temperatures measured by the at least two second surrounding light color temperature sensors, the display parameter adjusting unit 720 may take the maximum value between the at least two surrounding light color temperatures measured by the at least two second surrounding light color temperature sensors, or the average value or the weighted average value of the at least two surrounding light color temperatures measured by the at least two second surrounding light color temperature sensors as the second surrounding light color temperature.

After obtaining the first surrounding light color temperature and the second surrounding light color temperature, the display parameter adjusting unit 720 may further determine the maximum value between the first surrounding light color temperature and the second surrounding light color temperature or the average value or the weighted average value of the first surrounding light color temperature and the second surrounding light color temperature as the surrounding light color temperature for adjustment, and adjust the display color temperature setting of the display screen according to the surrounding light color temperature for adjustment.

The method for adjusting the display brightness of the display screen according to the surrounding light intensity for adjustment by the display parameter adjusting unit 720 may be referred to the method for adjusting the display brightness of the display screen according to the surrounding light intensity measured by the surrounding light intensity sensor as shown in FIG. 5A in the prior art, and will not be described here to avoid redundancy. The method for adjusting the display color temperature of the display screen according to the surrounding light color temperature for adjustment by the display parameter adjusting unit 720 may be referred to the method for adjusting the display color temperature of the display screen according to the surrounding light color temperature measured by the surrounding light color temperature sensor as shown in FIG. 5A in the prior art, and will not be described here to avoid redundancy.

It should be noted that the location where the surrounding light sensor is installed in the embodiments of the present disclosure is not limited to the cases shown in FIGS. 5A, 5B and 5C. The location on the first plane of the display screen where the surrounding light sensor is installed is not necessarily the same as that on the second plane of the display screen where the surrounding light sensor is installed. The number of the surrounding light sensors installed on the first plane of the display screen is not necessarily the same as that on the second plane of the display screen.

According to the embodiments of the present disclosure, the surrounding light information of the display screen is detected by sensors installed at two sides of the display screen, respectively, and the display parameter setting of the display screen is adjusted accordingly. Thereby, the display of the display screen is more adaptive to the surrounding illumination situation of the display screen, and the display effect of the display screen is improved.

Those skilled in the art may appreciate that the above description is made with the partition of the individual functional modules for the sake of convenience and brief. In the practical application, the above functions may be allocated to different functional modules when necessary. That is, the internal structure of the apparatus may be divided into different functional modules to fulfill all or part of the functions described above. The detail operation process of the system, the apparatus and the units described above may be referred to the corresponding process in the method embodiments described above, and will not be described here to avoid redundancy.

In the several embodiments provided in the present disclosure, it should be noted that the disclosed system, apparatus and method may be implemented in other ways. For example, the apparatus embodiment described above is only schematic. For example, the partition of the modules or the units is only a logical functional partition, and there may be other partition ways in practical implementation. For example, multiple units or components may be integrated or combined into another system, or some technical features may be omitted or not performed. Also, the coupling, the direct coupling or the communicational connection between each other as shown or discussed may be an indirect coupling or communicational connection between apparatuses or units via some interfaces electrically, mechanically or in some other way.

The units described as separated parts may be or may not be separated physically. The component shown as a unit may not be a physical unit. That is, the components may be at one location, or may be distributed to multiple network units. Part or all of the units may be selected to implement the embodiments according to the practical requirement.

Further, the individual functional units in the individual embodiments of the present disclosure may be integrated into one processing unit, or exist alone physically, or two or more units are integrated into one unit. The above integrated units may be realized by hardware, or may be realized by software functional unit.

The integrated units may be stored into one computer readable storage medium when implemented by software functional unit and may be sold or used as a stand-alone product. Based on such understanding, the technical solution of the present application, or all or part of the technical solution, that makes contribution to the prior art in essence, may be realized by software product. The computer software product is stored in a storage medium comprising several instructions for execution by a computer device such as a personal computer, a server, or a network device or the like or a processor to perform all or part of the steps of the method described in the embodiments of the present disclosure. The storage medium includes any medium that can store program codes such as a USB disk, a mobile hard disk, a Read-Only Memory, a Random Access Memory, a diskette or an optical disk.

As described above, the above embodiments are only intended to describe the technical solutions of the present disclosure in detail, which is only intended to help the methods and the core idea of the present disclosure to be better understood, and should not be considered as a limitation to the present disclosure. Any change or substitution easily being thought of by those skilled in the art within the technical scope disclosed by the present disclosure should be covered in the protection scope of the present disclosure.

What is claimed is:

1. An information processing method applied to an electronic device having a first sensor, a second sensor and a processing unit, the method comprising:

acquiring a first value of a first parameter by the first sensor;

acquiring a second value of the first parameter by the second sensor;

judging whether a difference value between the first value and the second value is larger than or equal to a first threshold or not, to obtain a first judgment result;

determining a third value of the first parameter based on a first algorithm, the first value and the second value, and reporting the third value as a value of the first parameter to the processing unit, when the first judgment result represents that the difference value is larger than or equal to the first threshold; and determining a fourth value of the first parameter based on a second algorithm, the first value and the second value, and reporting the fourth value as the value of the first parameter to the processing unit, when the first judgment result represents that the difference value is smaller than the first threshold.

2. The method of claim 1, wherein the first algorithm takes the larger value between the first value and the second value as the third value.

3. The method of claim 1, wherein the second algorithm takes an average value or a weighted average value of the first value and the second value as the fourth value.

4. The method of claim 1, wherein the first sensor is a first light sensor and the second sensor is a second light sensor; or, the first sensor is a first temperature sensor and the second sensor is a second temperature sensor; or, the first sensor is a first capacitance sensor and the second sensor is a second capacitance sensor; or, the first sensor is a first color temperature sensor and the second sensor is a second color temperature sensor.

5. The method of claim 1, further comprising: taking the third value as a standard parameter value of the first parameter by the processing unit so that a second parameter of the electronic device is adjusted according to the standard parameter value, after reporting the third value as the value of the first parameter to the processing unit.

6. The method of claim 1, further comprising: taking the fourth value as a standard parameter value of the first parameter by the processing unit so that a second parameter of the electronic device is adjusted according to the standard parameter value, after reporting the fourth value as the value of the first parameter to the processing unit.

7. The method of claim 1, wherein the first sensor is located on a first plane of a screen of the electronic device, and the second sensor is located on a second plane of the screen of the electronic device.

8. The method of claim 1, wherein the first parameter is a display parameter of a display screen of the electronic device, and the method further comprises:

adjusting a display parameter setting of the display screen based on the first parameter.

9. An electronic device having a first sensor, a second sensor and a processing unit, comprising:

a first acquiring module for acquiring a first value of a first parameter by the first sensor;

a second acquiring module for acquiring a second value of the first parameter by the second sensor;

a judging module for judging whether a difference value between the first value and the second value is larger than or equal to a first threshold or not, to obtain a first judgment result;

a first determining module for determining a third value of the first parameter based on a first algorithm, the first value and the second value, and reporting the third value as a value of the first parameter to the processing unit, when the first judgment result represents that the difference value is larger than or equal to the first threshold;

a second determining module for determining a fourth value of the first parameter based on a second algorithm, the first value and the second value, and reporting the fourth value as the value of the first parameter to the processing unit, when the first judgment result represents that the difference value is smaller than the first threshold.

10. The electronic device of claim 9, wherein the first algorithm takes the larger value between the first value and the second value as the third value.

11. The electronic device of claim 9, wherein the second algorithm takes an average value or a weighted average value of the first value and the second value as the fourth value.

12. The electronic device of claim 9, wherein the first sensor is a first light sensor and the second sensor is a second light sensor; or, the first sensor is a first temperature sensor and the second sensor is a second temperature sensor; or, the first sensor is a first capacitance sensor and the second sensor is a second capacitance sensor; or, the first sensor is a first color temperature sensor and the second sensor is a second color temperature sensor.

13. The electronic device of claim 9, further comprising: an operating module for taking the third value as a standard parameter value of the first parameter by the processing unit so that a second parameter of the electronic device is adjusted according to the standard parameter value, after reporting the third value as the value of the first parameter to the processing unit.

14. The electronic device of claim 9, further comprising: an operating module for taking the fourth value as a standard parameter value of the first parameter by the processing unit so that a second parameter of the electronic device is adjusted according to the standard parameter value, after reporting the fourth value as the value of the first parameter to the processing unit.

15. The electronic device of claim 9, wherein the first sensor is located on a first plane of a screen of the electronic device, and the second sensor is located on a second plane of the screen of the electronic device.

16. The electronic device of claim 9, wherein the first parameter is a display parameter of a display screen of the electronic device, and the electronic device further comprises:

an display parameter adjusting module for adjusting a display parameter setting of the display screen based on the first parameter.

* * * * *